(12) United States Patent
Umeda

(10) Patent No.: US 9,100,157 B2
(45) Date of Patent: Aug. 4, 2015

(54) LIKELIHOOD WEIGHTING CIRCUIT

(71) Applicant: FUJITSU LIMITED, Kawasaki-shi, Kanagawa (JP)

(72) Inventor: Masataka Umeda, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/532,027

(22) Filed: Nov. 4, 2014

(65) Prior Publication Data

US 2015/0155972 A1    Jun. 4, 2015

(30) Foreign Application Priority Data

Nov. 29, 2013    (JP) ................................. 2013-248328

(51) Int. Cl.
*H04L 27/06* (2006.01)
*H04L 1/00* (2006.01)
*H04L 27/26* (2006.01)

(52) U.S. Cl.
CPC .......... *H04L 1/0054* (2013.01); *H04L 27/2647* (2013.01)

(58) Field of Classification Search
CPC .............. H04B 1/06; H04B 3/54; H04B 3/46; H04B 7/0697; H04B 7/0413; H04L 27/01; H04L 1/0045; H04L 27/142; H04L 27/265; H04L 27/2614; H04L 27/2628; H04L 27/2626; H04L 27/2653; H04L 25/067
See application file for complete search history.

(56) References Cited

U.S. PATENT DOCUMENTS

| | | | |
|---|---|---|---|
| 2004/0121827 A1* | 6/2004 | Murakami et al. | 455/575.7 |
| 2008/0123516 A1* | 5/2008 | Anderson et al. | 370/208 |
| 2008/0192866 A1* | 8/2008 | Kasami | 375/341 |
| 2010/0104044 A1* | 4/2010 | Kishigami et al. | 375/299 |
| 2012/0300883 A1* | 11/2012 | Adachi et al. | 375/340 |
| 2013/0128938 A1* | 5/2013 | Yanagisawa et al. | 375/224 |
| 2013/0136214 A1 | 5/2013 | Yamagishi | |

FOREIGN PATENT DOCUMENTS

| | | |
|---|---|---|
| JP | 2000-244442 | 9/2000 |
| JP | 2003-258762 | 9/2003 |
| JP | 2008-010987 | 1/2008 |
| JP | 2008-153751 | 7/2008 |
| JP | 2013-110486 | 6/2013 |
| JP | 2013-115542 | 6/2013 |
| WO | 2008-117427 | 10/2008 |

\* cited by examiner

*Primary Examiner* — Syed Haider
(74) *Attorney, Agent, or Firm* — Fujitsu Patent Center

(57) ABSTRACT

A likelihood weighting circuit includes a weighting part assigning a weight to a first soft-decision likelihood for a subcarrier in a received signal based on a power value of the received signal or a modulation error ratio of the subcarrier, a first variance calculator calculating a variance of the power value, a second variance calculator calculating a variance of the modulation error ratio, a likelihood measurement part measuring a distribution of a second soft-decision likelihood obtained by assigning the weight to the first soft-decision likelihood, a controller computing a first relaxing level of the power value and a second relaxing level of the modulation error ratio based on the respective variances, and a value of the second soft-decision likelihood, a first normalization processor normalizing the power value based on the first relaxing level, and a second normalization processor normalizing the modulation error ratio based on the second relaxing level.

10 Claims, 10 Drawing Sheets

BEFORE NORMALIZATION

| SUBCARRIER No. | 1 | 2 | 3 | 4 | 5 | 6 | 7 | 8 |
|---|---|---|---|---|---|---|---|---|
| CH(n) | 8 | 10 | 11 | 8 | 6 | 6 | 8 | 10 |
| MER(n) | 15 | 13 | 2 | 15 | 2 | 4 | 2 | 14 |

AFTER NORMALIZATION

| SUBCARRIER No. | 1 | 2 | 3 | 4 | 5 | 6 | 7 | 8 |
|---|---|---|---|---|---|---|---|---|
| CHn(n) | 8 | 10 | 11 | 8 | 6 | 6 | 8 | 10 |
| MERn(n) | 12 | 11 | 5 | 12 | 5 | 7 | 5 | 10 |

BEFORE NORMALIZATION

| SUBCARRIER No. | 1 | 2 | 3 | 4 | 5 | 6 | 7 | 8 |
|---|---|---|---|---|---|---|---|---|
| CH(n) | 8 | 10 | 11 | 8 | 6 | 6 | 8 | 10 |
| MER(n) | 15 | 13 | 2 | 15 | 2 | 4 | 2 | 14 |

AFTER NORMALIZATION

| SUBCARRIER No. | 1 | 2 | 3 | 4 | 5 | 6 | 7 | 8 |
|---|---|---|---|---|---|---|---|---|
| CHn(n) | 9 | 10 | 10 | 9 | 7 | 7 | 8 | 9 |
| MERn(n) | 13 | 12 | 4 | 13 | 4 | 6 | 4 | 12 |

LIKELIHOOD WEIGHTING CIRCUIT

CROSS-REFERENCE TO RELATED APPLICATION

This patent application is based upon, and claims the benefit of priority of Japanese Patent Application No. 2013-248328 filed on Nov. 29, 2013, the entire contents of which are incorporated herein by reference.

FIELD

The disclosures discussed herein relate to a likelihood weighting circuit.

BACKGROUND

There is disclosed in the related art an orthogonal frequency-division multiplexing (OFDM) demodulation device having a Viterbi decoder configured to decode a convolutional code, a fading determination unit configured to determine a fading level of a primary demodulated signal, and a soft-decision bit selector configured to select from the demodulated signal soft-decision bits to be input into the Viterbi decoder. The soft-decision bit selector selects part of the demodulated signal as soft-decision bits based on the fading level determined by the fading determination unit. Further, the fading determination unit computes the maximum amplitude difference between the highest amplitude value and the lowest amplitude value of each of subcarriers in the propagation path estimating preamble to determine a fading level based on the computed maximum amplitude difference (e.g., Patent Document 1).

In addition, there is disclosed in the related art a receiver having a demodulator configured to soft-decision demodulate a received signal, a mode detector configured to detect the mode in signal amplitudes based on a frequency distribution of the soft-decision signal amplitudes in a decoding unit-interval of an output signal of the demodulator, a normalization unit configured to normalize soft-decision signal series based on the detected mode, and a decoder configured to decode received data based on the normalized soft-decision signal series (e.g., Patent Document 2).

In the related art OFDM demodulation device, the fading level is determined based on the maximum amplitude or the variance between the highest value and the lowest value of each of the subcarriers to optimize a soft-decision bit scale of likelihood information. Hence, in the related art technique, the appropriate likelihood may be obtained under a frequency selective fading environment where a level of receiving a specific frequency is lowered.

However, under an environment where spurious noise is generated against a specific frequency, the effect of the spurious noise is mixed with the effect of the frequency selective fading. Hence, the appropriate mode (likelihood) will not be obtained by the normalization of the soft-decision signal series alone.

RELATED ART DOCUMENTS

Patent Document 1: Japanese Laid-open Patent Publication No. 2003-258762
Patent Document 2: Japanese Laid-open Patent Publication No. 2008-153751

SUMMARY

According to an aspect of the embodiments, there is provided a likelihood weighting circuit that includes a weighting part configured to assign a weight to a first soft-decision likelihood obtained by soft-decision performed with respect to a subcarrier included in a received signal decoded by an OFDM based on one of a power value of the received signal and a modulation error ratio of the subcarrier; a first variance calculator configured to calculate a variance of the power value of the received signal; a second variance calculator configured to calculate a variance of the modulation error ratio of the subcarrier; a likelihood measurement part configured to measure a distribution of a second soft-decision likelihood obtained by assigning the weight to the first soft-decision likelihood obtained by the weighting part; a controller configured to compute a first relaxing level of the power value of the received signal and a second relaxing level of the modulation error ratio of the subcarrier based on the variance of the power value, the variance of the modulation error ratio, and a value of the second soft-decision likelihood; a first normalization processor configured to perform a first normalization process on the power value of the received signal input to the weighting part based on the first relaxing level; and a second normalization processor configured to perform a second normalization process on the modulation error ratio of the subcarrier input to the weighting part based on the second relaxing level.

It is to be understood that both the foregoing general description and the following detailed description are exemplary and explanatory and are not restrictive of the invention.

Additional objects and advantages of the embodiments will be set forth in part in the description which follows, and in part will be obvious from the description, or may be learned by practice of the invention.

DESCRIPTION OF EMBODIMENTS

It may be desirable to provide a likelihood weighting circuit capable of computing appropriate likelihood under an environment of the spurious noise effect and the frequency selective fading effect being imposed.

In the following, a description is given of embodiments to which a likelihood weighting circuit is applied.

First Embodiment

Figure 1:
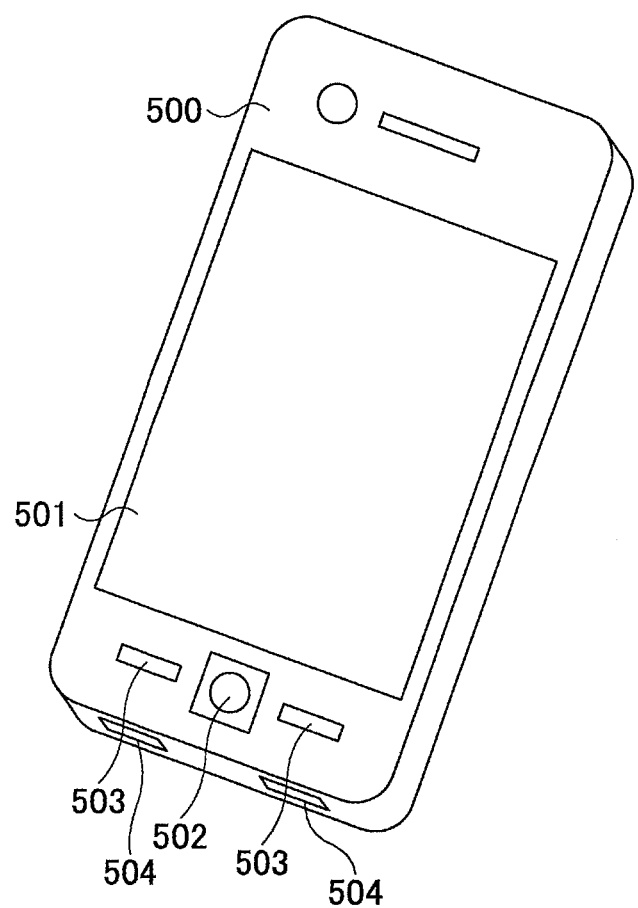
FIG. 1 is a perspective diagram illustrating a front side of a smartphone terminal apparatus 500 including a likelihood weighting circuit of a first embodiment.

FIG. 1 is a perspective diagram illustrating a front side of a smartphone terminal apparatus 500 including a likelihood weighting circuit of a first embodiment.

The smartphone terminal apparatus 500 of the first embodiment includes a display panel 501 on a front side of the smartphone terminal apparatus 500, and a touch panel on a surface of the display panel 501. Further, a home button 502 and switches 503 are disposed on a lower side of the display panel 501. In addition, speakers 504 are disposed in a lateral surface of the display panel 501.

The smartphone terminal apparatus 500 having such a configuration has an antenna configured to receive radio waves of terrestrial digital television broadcasting. The smartphone terminal apparatus 500 displays an image of a TV (television) program on the display panel 501, and also outputs voice and sound from the speakers 504. The antenna which receives radio waves of terrestrial digital television broadcasting may either be embedded in the smartphone terminal apparatus 500, be configured externally projectable from its housing, or disposed outside its housing.

The smartphone terminal apparatus 500 includes an orthogonal frequency division multiplexing (OFDM) receiver configured to receive signals of terrestrial digital television broadcasting. Note that in the following, a description is given of an OFDM receiver of the first embodiment configured to receive signals of terrestrial digital television broadcasting. However, signals to be received by the OFDM receiver of the first embodiment are not limited to the signals of terrestrial digital television broadcasting, and the signals to be received by the OFDM receiver of the first embodiment may be third generation or fourth generation data signals.

Figure 2:
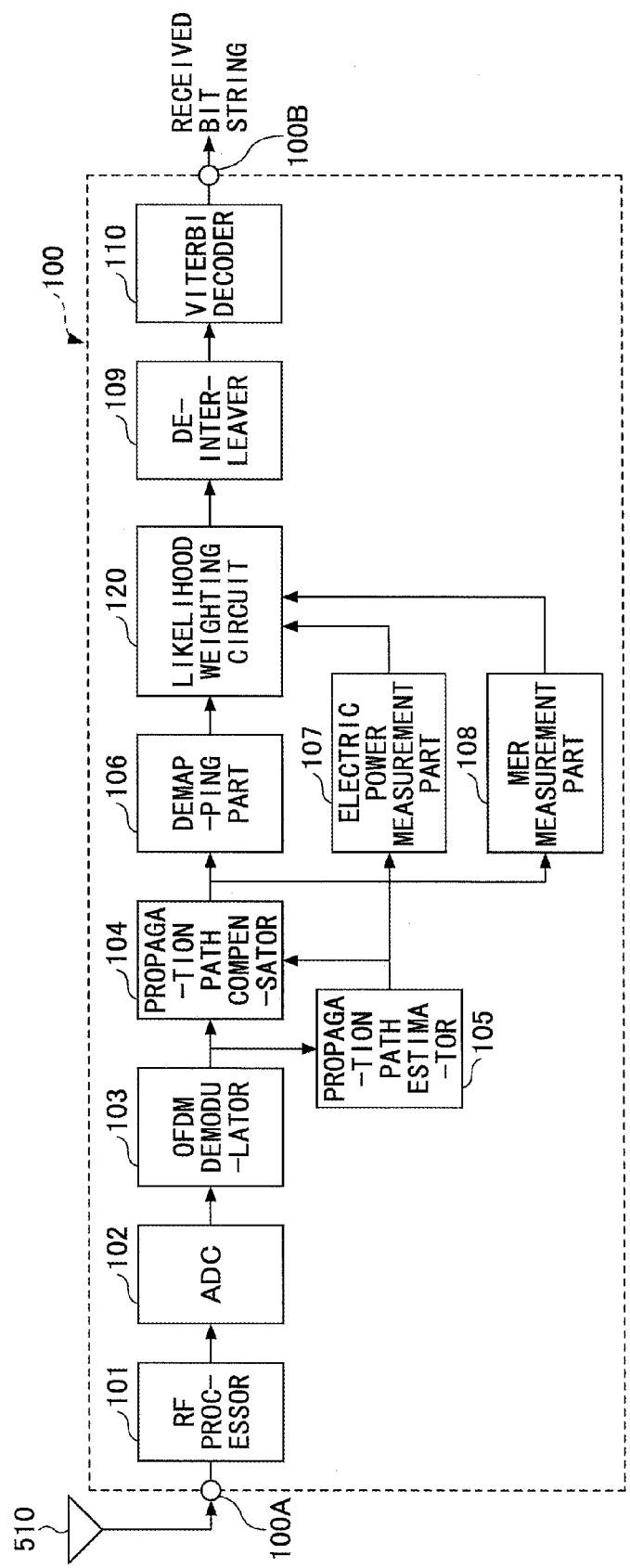
FIG. 2 is a diagram illustrating an orthogonal frequency-division multiplexing (OFDM) receiver 100 of a first embodiment.

FIG. 2 is a diagram illustrating an orthogonal frequency-division multiplexing (OFDM) receiver 100 of a first embodiment. The OFDM receiver 100 is connected with an antenna 510. The antenna 510 serves as an antenna of the smartphone terminal apparatus 500 illustrated in FIG. 1, and receives signals of terrestrial digital television broadcasting.

The OFDM receiver 100 includes an input terminal 100A, an output terminal 100B, a radio frequency (RF) processor 101, an analog-to-digital converter (ADC) 102, an orthogonal frequency-division multiplexing (OFDM) demodulator 103, a propagation path compensator 104, a propagation path estimator 105, a demapping part 106, and an electric power measurement part 107.

The OFDM receiver 100 further includes a modulation error ratio (MER) measurement part 108, a likelihood weighting circuit 120, a de-interleaver 109, and a Viterbi decoder 110.

The input terminal 100A is connected to the antenna 510, and further connected to the RF processor 101 inside the OFDM receiver 100. The signals (received signals) of terrestrial digital television broadcasting received by the antenna 510 are input into the OFDM receiver 100 via the input terminal 100A, and further input into the RF processor 101.

The output terminal 100B is connected to an output terminal of the Viterbi decoder 110, and outputs a received bit string decoded by the OFDM receiver 100 into an internal circuit of the smartphone terminal apparatus 500 (see FIG. 1).

The RF processor 101 is in an interval and connected between the input terminal 100A and the ADC 102. The RF processor 101 performs an amplification process, a filtering process, a down-converting process, an orthogonal demodulating process, and the like with respect to a received signal, and output the processed result into the ADC 102.

The ADC 102 is connected to an interval between the RF processor 101 and the OFDM demodulator 103, and converts the received analog signal received from the RF processor 101 into a digital signal and outputs the digital signal as the digital received signal into the OFDM demodulator 103.

The OFDM demodulator 103 is in an interval and connected between the ADC 102 and the propagation path compensator 104, and also is in an interval connected between the ADC 102 and the propagation path estimator 105. The OFDM demodulator 103 performs Fourier transformation with respect to the digital received signal input from the ADC 102. The Fourier transformation is a mathematical transformation used to transform a time domain signal into a frequency domain signal. Thus, the OFDM demodulator 103 demodulates OFDM signals and computes a frequency domain signal (called frequency signal) with respect to each of subcarriers included in the received signal demodulated by the OFDM demodulator 103.

The OFDM demodulator 103 outputs a frequency signal to each of the subcarriers into the propagation path compensator 104 and the propagation path estimator 105.

The propagation path compensator 104 is connected in parallel with the propagation path estimator 105 on the output side of the OFDM demodulator 103. In other words, the signal line is branched at the output side of the OFDM demodulator 103, and the propagation path compensator 104 is connected to one of the branched signal lines.

The propagation path compensator 104 compensates for a propagation path distortion for each of subcarriers with respect to the frequency signal supplied from the OFDM demodulator 103 based on a propagation path estimating value input from the propagation path estimator 105. The frequency signal obtained after the propagation path distortion is compensated for by the propagation path compensator 104 is supplied to the demapping part 106 and the MER measurement part 108.

The propagation path estimator 105 is connected to the other one of the two branched signal lines at the output side of the OFDM demodulator 103. The propagation path estimator 105 computes a propagation path estimation value of each of the subcarriers by utilizing a known pilot signal or the like distributed for a corresponding one of the subcarriers. The propagation path estimation value computed by the propagation path estimator 105 is input into the propagation path compensator 104 and the electric power measurement part 107.

The demapping part 106 performs a digital demodulation process on the received signal of the frequency signal of each of the subcarriers, the propagation path distortion of which is compensated for by the propagation path compensator 104, so as to compute soft-decision likelihood X(n,i).

Note that n represents a subcarrier number contained in the received signal demodulated by the OFDM, and it is assumed that the received signal includes N subcarriers in the embodiments of the present specification. Hence, the subcarrier number n acquires one of values from 1 to N.

Note also that i represents a bit number of a digital modulation. In the present embodiment, an illustration is given of a case where a digital modulation called "16 quadrature amplitude modulation (QAM)" is applied to each of the subcarriers. Since 16QAM is able to propagate 4-bit information per subcarrier, the bit number i acquires one of values from 1 to 4.

Note that the method for computing the likelihood X(n,i) will be illustrated later with reference to FIG. 3.

The electric power measurement part 107 computes electric power (or amplitude) of the propagation path estimation value of each subcarrier obtained by the propagation path estimator 105. The output terminal of the electric power measurement part 107 is connected to the likelihood weighting circuit 120, and a signal representing channel power CH(n) of each subcarrier is input into the likelihood weighting circuit 120.

The MER measurement part 108 computes the mean value of the modulation error ratios (MER) for each of the subcarriers based on the frequency signal of a corresponding one of the subcarriers, the propagation path distortion of which is compensated for by the propagation path compensator 104. In the following, the mean value of the modulation error ratios (MER) is simply referred to as a mean modulation error ratio MER(n).

The output terminal of the electric power measurement part 108 is connected to the likelihood weighting circuit 120, and a signal representing the mean modulation error ratio MER(n) is input into the likelihood weighting circuit 120.

The mean modulation error ratio MER(n) is computed based on the following equation (1) when err(n) represents a distance from a transmission point of the 16 QAM closest to the received signal point after the propagation path distortion is compensated for by the propagation path compensator 104.

$$MER(n)=E[Sm/err(n)] \quad (1)$$

In the equation (1), Sm represents the mean value of the received signal power. The function E[ ] is a type of a function which calculates an ensemble mean value. In general, the ensemble mean value of the modulation errors for each carrier is calculated by obtaining the time average of the modulation error ratio (MER) of the former and latter symbol times.

The likelihood weighting circuit 120 assigns weights to the soft-decision likelihood X(n,i) by utilizing a signal representing channel power CH(n) for each of the subcarriers input from the electric power measurement part 107, and a signal representing the mean modulation error ratio MER(n) for a corresponding one of the subcarriers input from the MER measurement part 108, and outputs a soft-decision likelihood Y(n,i).

The output terminal of the likelihood weighting circuit 120 is connected to the de-interleaver 109, and the soft-decision likelihood Y(n,i) to which the weights are assigned is input into the de-interleaver 109. Note that details of the assignment of the weights by the likelihood weighting circuit 120 will be described later with reference to FIG. 5.

The de-interleaver 109 performs a rearranging process of the order of the soft-decision likelihood Y(n,i) to each of which the weights are assigned by the likelihood weighting circuit 120. The soft-decision likelihood Y(n,i) the order of which is rearranged is input into the Viterbi decoder 110.

The Viterbi decoder 110 performs an error correction decoding process to compute a received bit string based on a bit string of the rearranged soft-decision likelihood Y(n,i).

Figure 3:
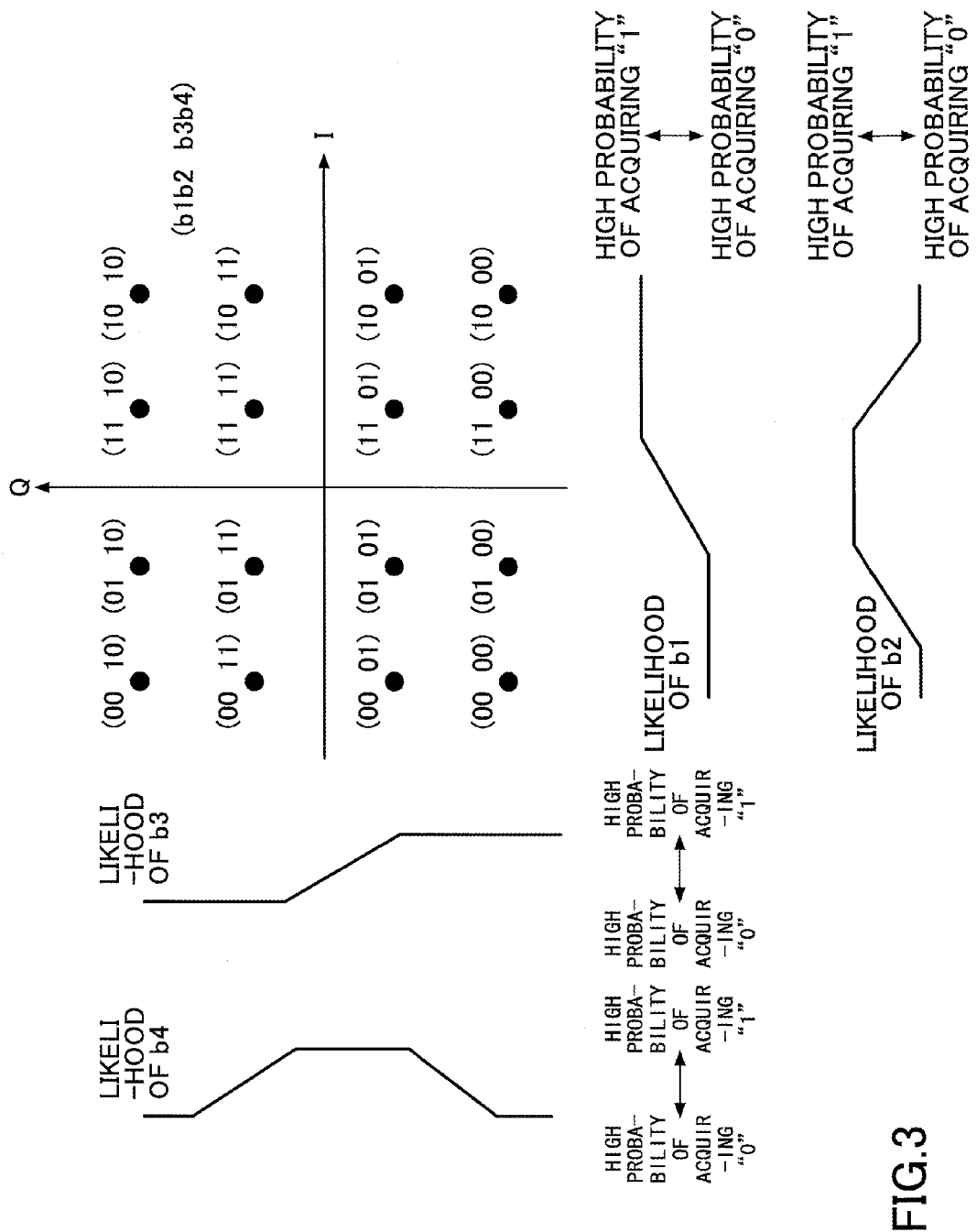
FIG. 3 includes diagrams illustrating an arrangement of received signal points of frequency signals, and characteristics of soft-decision likelihood X(n,i) for each bit acquired by a demapping part 106.

FIG. 3 is a diagram illustrating an arrangement of transmission signal points of 16 QAM and characteristics of the soft-decision likelihood when the soft-decision likelihood X(n,i) is obtained in the demapping part 106.

The demapping part 106 computes soft-decision likelihood X(n,i) for each of bits based on the received signal points of the frequency signal of a corresponding one of the subcarriers, the propagation path distortion of which is compensated for by the propagation path compensator 104. As described above, n represents a subcarrier number, and i represents a bit number of a digital modulation. Note that i is any one of 1 to 4 in a case of 16QAM.

The 16 points in FIG. 3 represent an arrangement of transmission signal points in 16QAM. The transmission signal points are arranged in the Cartesian (orthogonal) coordinate system having a horizontal axis I and a vertical axis Q. Further, characteristics of four lines beside the signal arrangement of 16QAM represent soft-decision likelihood characteristics to determine soft-decision likelihood value of each bit $bi(1 \leq i \leq 4)$.

A 4-bit (b0, b1, b2, b3) digital signal ("0" or "1") is carried by each of 16 transmission signal points arranged in 16QAM. The received signals are affected by noise or fading, and hence, each of the received signal points shifts from a corresponding one of the transmission signal points. Accordingly, the soft-decision likelihood X(n,i) with respect to the received signal is set in proportion to a distance from a digital value ("0" or "1") of each bit of the received signal point and the transmission signal point.

For example, a value of the bit b1 depends on a coordinate value of the horizontal axis I alone and does not depend on a coordinate value of the vertical axis Q. The value of the bit b1 is likely to be "0" when a coordinate value of the horizontal axis I is negative, and is likely to be "1" when a coordinate value of the horizontal axis I is positive. Hence, when I=0, the probability of acquiring "0" and "1" is fifty-fifty (50%). This indicates characteristics of the likelihood of obtaining the bit value b1 of "1" being raised along the horizontal axis I as the positive amplitude increases, and of the likelihood of obtaining the bit value b1 of "0" being raised along the horizontal axis I as the negative amplitude increases.

Further, a value of the bit b2 depends on a coordinate value of the horizontal axis I alone and does not depend on a coordinate value of the vertical axis Q. The value of the bit b2 is likely to be "1" when a coordinate value of the horizontal axis I is close to the intersection with the vertical axis Q, and the value of the bit b2 is likely to be "0" when a coordinate value of the horizontal axis I is away from the intersection with the vertical axis Q. Hence, the probability (likelihood) of acquiring "0" and "1" is fifty-fifty (50%) between the two negative transmission signal points, and between the two positive transmission signal points aligned in four lines of the 16 received signal points in the horizontal axis I in a matrix of 4 rows and 4 columns. This indicates characteristics of increasing the likelihood of obtaining "1" as a coordinate value of the horizontal axis I moves closer to the intersection with the vertical axis Q, and increasing the likelihood of obtaining "0" as the coordinate value of the horizontal axis I moves away from the intersection with the vertical axis Q.

Moreover, a value of the bit b3 depends on a coordinate value of the vertical axis Q alone and does not depend on a coordinate value of the horizontal axis I. The value of the bit b3 is likely to be "1" when a coordinate value in the vertical axis Q is positive, and is likely to be "0" when a coordinate value in the vertical axis Q is negative. Hence, when Q=0, the probability of acquiring "0" and "1" is fifty-fifty (50%). This indicates characteristics of the likelihood of obtaining the bit value b3 of "0" being raised along the vertical axis Q as the positive amplitude increases, and of the likelihood of obtaining the bit value b3 of "1" being raised along the vertical axis Q as the negative amplitude increases.

Moreover, a value of the bit b4 depends on a coordinate value of the vertical axis Q alone and does not depend on a coordinate value of the horizontal axis I. When the value of the bit b4 is likely to be "1" when a coordinate value of the vertical axis Q is close to the intersection with the horizontal axis I, and is likely to be "0" when a coordinate value of the vertical axis Q is away from the intersection with the horizontal axis I. Hence, the likelihood of acquiring "0" and "1" is fifty-fifty (50 for each) between the two negative transmission signal points, and between the two positive transmission signal points aligned in four lines in the vertical axis Q of the 16 received signal points arranged in a matrix of 4 rows and 4 columns. This indicates characteristics of increasing the likelihood of obtaining "1" as a coordinate value of the vertical axis Q moves closer to the intersection with the horizontal axis I, and increasing the likelihood of obtaining "0" as the coordinate value of the vertical axis Q moves away from the intersection with the horizontal axis I.

The soft-decision likelihood X(n,i) for each of bits computed by the demapping part 106 is input into the likelihood weighting circuit 120.

Figure 4:
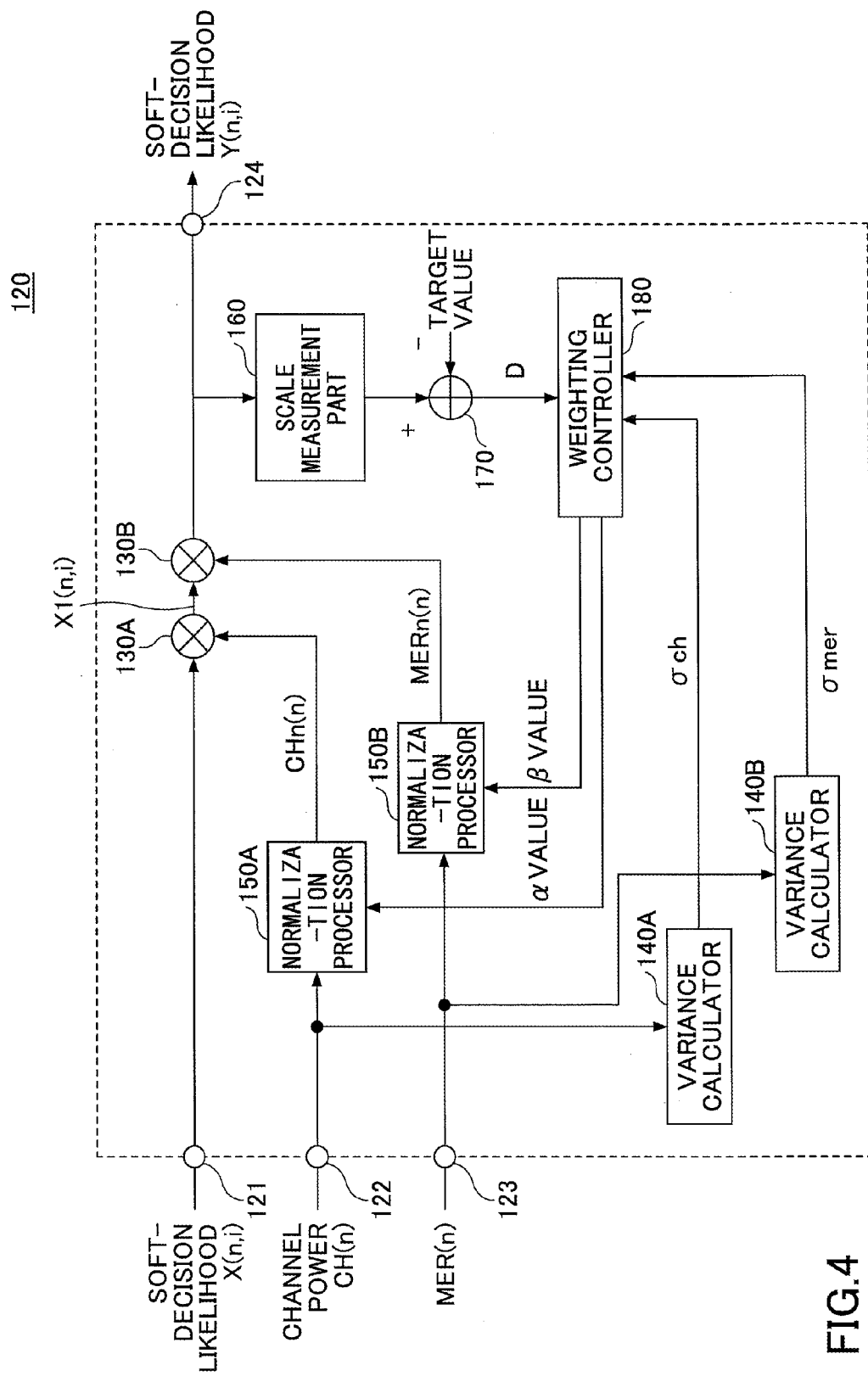
FIG. 4 is a diagram illustrating a likelihood weighting circuit 120 of a first embodiment.

FIG. 4 is a diagram illustrating the likelihood weighting circuit 120 of the first embodiment.

The likelihood weighting circuit 120 includes input terminals 121, 122, and 123, an output terminal 124, multipliers 130A and 130B, variance calculators 140A and 140B, a normalization processor 150A, a normalization processor 150B, a scale measurement part 160, an adder 170, and a weighting controller 180.

The input terminal 121 is connected to the demapping part (see FIG. 2), and receives soft-decision likelihood X(n,i). The input terminal 121 is connected to the multiplier 130A inside the likelihood weighting circuit 120, and is configured to input the received soft-decision likelihood X(n,i) into the multiplier 130A.

The input terminal 122 is connected to the electric power measurement part 107, and receives channel power CH(n) of each subcarrier. The input terminal 122 is connected to the variance calculator 140A and the normalization processor 150A inside the likelihood weighting circuit 120, and inputs the received channel power CH(n) into the variance calculator 140A and the normalization processor 150A.

The input terminal 123 is connected to the MER measurement part 108, and receives the mean modulation error ratio MER(n). The input terminal 123 is connected to the variance calculator 140B and the normalization processor 150B inside the likelihood weighting circuit 120, and inputs the received mean modulation error ratio MER(n) into the variance calculator 140B and the normalization processor 150B.

The output terminal 124 is connected to the output terminal of the multiplier 130B inside the likelihood weighting circuit 120, and is connected to the input terminal of the de-interleaver 109 outside the likelihood weighting circuit 120. The output terminal 124 outputs soft-decision likelihood Y(n,i) into the de-interleaver 109. The soft-decision likelihood Y(n, i) is obtained from the likelihood weighting circuit 120 that has assigned weights to the soft-decision likelihood X(n,i) to obtain the soft-decision likelihood Y(n,i).

The two input terminals of the multiplier 130A are connected respectively to the input terminal 121 and the output terminal of the normalization processor 150A, and the output terminal of the multiplier 130A is connected to the input terminal of the multiplier 130B. The multiplier 130A multiplies the soft-decision likelihood X (n,i) supplied from the input terminal 121 by the channel power CHn(n) normalized by the normalization processor 150A, and to input the multiplied soft-decision likelihood X1(n,i) into the multiplier 130B.

The input terminal of the multiplier 130B is connected to the output terminal of the multiplier 130A, and the output terminal of the multiplier 130B is connected to the output terminal 124 and an input terminal of the scale measurement part 160. The multiplier 130B multiplies the soft-decision likelihood X1(n,i) supplied from the multiplier 130A by the mean modulation error ratio MERn(n) normalized by the normalization processor 150B, and to output the soft-decision likelihood Y (n,i) into the output terminal 124 and the scale measurement part 160.

Note that the multipliers 130A and 130B are an example of a weighting part. The multipliers 130A and 130B may be formed of one multiplier configured to compute the soft-decision likelihood Y(n,i) from the soft-decision likelihood X(n,i) by utilizing the channel power CHn(n) and the mean modulation error ratio MERn(n).

Respective output terminals of the variance calculators 140A and 140B are connected to two of three input terminals of the weighting controller 180. The variance calculator 140A computes a variance σ ch based on propagation power (channel power) CH(n) supplied from the input terminal 122. On the other hand, the variance calculator 140B computes a variance σ mer based on the mean modulation error ratio MER(n) supplied from the input terminal 123. The variances σ ch and σ mer are computed by the following equations (2) and (3), respectively.

$$\sigma_{ch} = \frac{1}{N}\sum_{n=1}^{N}\{CHm - CH(n)\}^2 \quad (2)$$

In the equation (2), CHn represents the channel power of all the subcarriers. That is, the variance σ ch is obtained by dividing the sum of values each obtained by $\{CHm-CH(n)\}^2$ of the subcarriers by N, where the subcarrier number n is 1 to N.

$$\sigma_{mer} = \frac{1}{N}\sum_{n=1}^{N}\{MERm - MER(n)\}^2 \quad (3)$$

In the equation (3), MERm represents the mean value of the modulation error ratios of all the subcarriers. That is, the variance c mer is obtained by dividing the sum of values each obtained by $\{MERm-MER(n)\}^2$ of the subcarriers by N, when the subcarrier number n is 1 to N.

The respective variances σ ch and σ mer computed by the variance calculators 140A and 140B are input into the weighting controller 180.

One of the two input terminals of the normalization processor 150A is connected to the input terminal 122, and the other terminal of the normalization processor 150A is connected to one of two output terminals of the weighting controller 180. Further, the output terminal of the normalization processor 150A is connected to one of the two input terminals of the multiplier 130A.

The normalization processor 150A normalizes the channel power CH(n) supplied from the input terminal 122 based on the α value supplied from the weighting controller 180, and to output the channel power CHn(n) into the multiplier 130A. The channel power CHn(n) is obtained by normalizing the channel power CH(n) based on the α value.

The normalization processor 150A performs the normalization by the following equation (4).

$$CHn(n) = sgn(CH(n)) \times \frac{|CH(n)| + \alpha}{\sum_{n=1}^{N} \{|CH(n)| + \alpha\}/N} \quad (4)$$

In the equation (4), sgn(x) is a signum function. The signum function sgn(x) is represented by the following equation (5).

$$sgn(x) = \begin{cases} 1 : x > 0 \\ -1 : x < 0 \\ 0 : x = 0 \end{cases} \quad (5)$$

The normalized channel power CHn(n) may be obtained based on the signum function sgn(x), the α value, and the absolute value of the channel power CH(n).

The α value represents a level of relaxing the assignment of the weight to the soft-decision likelihood X(n,i) based on the channel power CH(n). The α value is set at a higher value as the later-described difference D or the channel power variance σ ch increases. That is, the higher the difference D or the channel power variance σ ch is, the more relaxed direction the weight is assigned to the soft-decision likelihood X(n,i) based on the channel power CH(n).

One of the two input terminals of the normalization processor 150B is connected to the input terminal 123, and the other terminal of the normalization processor 150B is connected to one of the two output terminals of the weighting controller 180. Further, the output terminal of the normalization processor 150B is connected to the other one of the two input terminals of the multiplier 130B.

The normalization processor 150B normalizes the mean modulation error ratio MER(n) supplied from the input terminal 123 based on a β value supplied from the weighting controller 180, and to output the mean modulation error ratio MERn(n) into the multiplier 130A. The mean modulation error ratio MERn(n) is obtained by normalizing the mean modulation error ratio MER(n) based on the β value.

The normalization processor 150B performs the normalization process by the following equation (6).

$$MERn(n) = sgn(MER(n)) \times \frac{|MER(n)| + \beta}{\sum_{n=1}^{N} \{|MER(n)| + \beta\}/N} \quad (6)$$

The mean modulation error ratio MERn(n) may be obtained based on the signum function sgn(x), the β value, and the absolute value of the mean modulation error ratio MER(n).

The β value represents a level of relaxing the assignment of the weight to the soft-decision likelihood X(n,i) based on the mean modulation error ratio MER(n). The β value is set at a higher value as the later-described difference D or the modulation error ratio variance σ mer increases. That is, the higher the difference D or the modulation error ratio variance σ mer is, the more relaxed direction the weight is assigned to the soft-decision likelihood X(n,i) based on the mean modulation error ratio MER(n).

Further, as illustrated in equations (4) and (6), when the weights are assigned to the soft-decision likelihood X(n,i) by utilizing the normalized channel power CHn(n) and the normalized mean modulation error ratio MER(n) to which the respective values α and β of the relaxing levels are added, the variances of the assigned weights of the soft-decision likelihood Y(n,i) may decrease. That is, the weight distortion (the amplitude deviation) of the soft-decision likelihood Y(n,i) is relaxed, and the number of subcarriers having a decreased scale of the soft-decision likelihood Y(n,i) is decreased. As a result, Viterbi decoding performance may be improved.

The input terminal of the scale measurement part 160 is connected to the output terminal of the multiplier 130B, and the output terminal of the scale measurement part 160 is connected to a positively polarized input terminal (+).

The scale measurement part 160 computes a scale value Ym serving as an index of a likelihood distribution of the soft-decision likelihood Y(n,i). For example, when the soft-decision likelihood employs a smaller subcarrier number as a scale value Ym, a threshold process is performed on the amplitude, and the subcarrier numberless than the threshold is used as the scale value Ym. As another index, a mean value or a mode value of the likelihood amplitudes may be employed. The scale value Ym computed by scale measurement part 160 is supplied into a positively polarized input terminal (+) of the adder 170.

The positively polarized input terminal (+) of the adder 170 is connected to the output terminal of the scale measurement part 160, and a target value is input into a negatively polarized input terminal (−) of the adder 170. The target value of the negatively polarized input terminal (−) of the adder 170 is a target value of the soft-decision likelihood Y(n,i), which is set at a predetermined value.

The adder 170 outputs the difference D obtained by subtracting the target value from the scale value Ym supplied from the scale measurement part 160.

Note that the target value input into the negatively polarized input terminal (−) of the adder 170 may be set at a higher value as an encoding ratio of error correction or an encoding ratio of the digital modulation increases. When 64QAM is utilized for the digital modulation, the number of bits per carrier increases compared to 16QAM. Hence, likelihood resolution per bit may be reduced. Accordingly, it is preferable to employ a greater target value. By contrast, when quadrature phase shift keying (QPSK) is utilized for the digital modulation, the number of bits per carrier decreases compared to 16QAM. Hence, likelihood resolution per bit may be increased. Accordingly, it is preferable to employ a smaller target value. The respective two of the three input terminals of the weighting controller 180 are connected to the output terminal of the variance calculator 140A and the output terminal of the variance calculator 140B. Hence, the two of the three input terminals of the weighting controller 180 receive the variance σ ch of the channel power CH(n) and the variance σ mer of the mean modulation error ratio MERn(n), respectively. The remaining one input terminal of the weighting controller 180 is connected to the output terminal of the adder 170, and the respective two output terminals of the weighting controller 180 are connected to the other input terminal of the normalization processor 150A and the other input terminal of the normalization processor 150B.

The weighting controller 180 computes the α value based on the variance σ ch input from the variance calculator 140A and the difference D input from the adder 170, and to compute the β value based on the variance σ mer input from the variance calculator 140B and the difference D input from the adder 170. The weighting controller 180 is an example of a controller.

The α value indicates a level of relaxing the assignment of the weight to the soft-decision likelihood X (n,i) based on the channel power CH(n). The α value is an example of a first relaxing level. The α value is set at a higher value as the difference D output from the adder 170 or the variance σ ch increases. Thus, the higher the difference D or the channel power variance σ ch is, the more relaxed the assignment of the weight to the soft-decision likelihood X (n,i) based on the channel power CH(n) is.

The β value indicates a level of relaxing the assignment of the weight to the soft-decision likelihood X (n,i) based on the mean modulation error ratio MER(n). The β value is an example of a second relaxing level. The β value is set at a higher value as the difference D output from the adder 170 or the variance σ mer increases. Thus, the higher the difference D or the channel power variance σ mer is, the more relaxed the assignment of the weight to the soft-decision likelihood X (n,i) based on the mean modulation error ratio MER(n) is.

Note that the α value and the β value may, for example, be determined as follows. Basically, the α value and the β value may be set in proportion to the variance σ ch and the variance σ mer, respectively.

Initially, the variance σ ch, the difference Δ ch between the variance σ ch and an index value σ ch_target, the variance σ mer, and the difference Δ mer between the variance σ mer and an index value σ mer_target are computed by the following equations (7) and (8).

$$\Delta ch = \sigma ch - \sigma ch\_target \quad (7)$$

$$\Delta mer = \sigma mer - \sigma mer\_target \quad (8)$$

When only one of the difference Δ ch and the difference Δ mer is a negative value, a relaxing level is set only for the other difference. Specifically, the α value and the β value are set as follows.

$$\text{When } \Delta ch < 0, \Delta mer > 0, \alpha = 0, \beta = D \times K \quad (9)$$

$$\text{When } \Delta ch > 0, \Delta mer < 0, \alpha = 0, \beta = 0 \quad (10)$$

When both the differences Δ ch and Δ mer are negative values (Δ ch>0, Δ mer>0), the α value and the β value are set by the following equations (11) and (12) based on the ratio of the differences Δ ch and Δ mer.

$$\alpha = D \times K \times \Delta ch / (\Delta ch + \Delta mer) \quad (11)$$

$$\beta = D \times K \times \Delta mer / (\Delta ch + \Delta mer) \quad (12)$$

Note that when both the differences Δ ch and Δ mer are negative values, the values applied to the index values σ ch_target and σmer_target are reduced, and the above-described process is performed again to acquire the α value and the β value. Further, the values applied to coefficient K in the equations (9), (10), (11), and (12) may appropriately be set for setting the α value and the β value.

Figure 5:
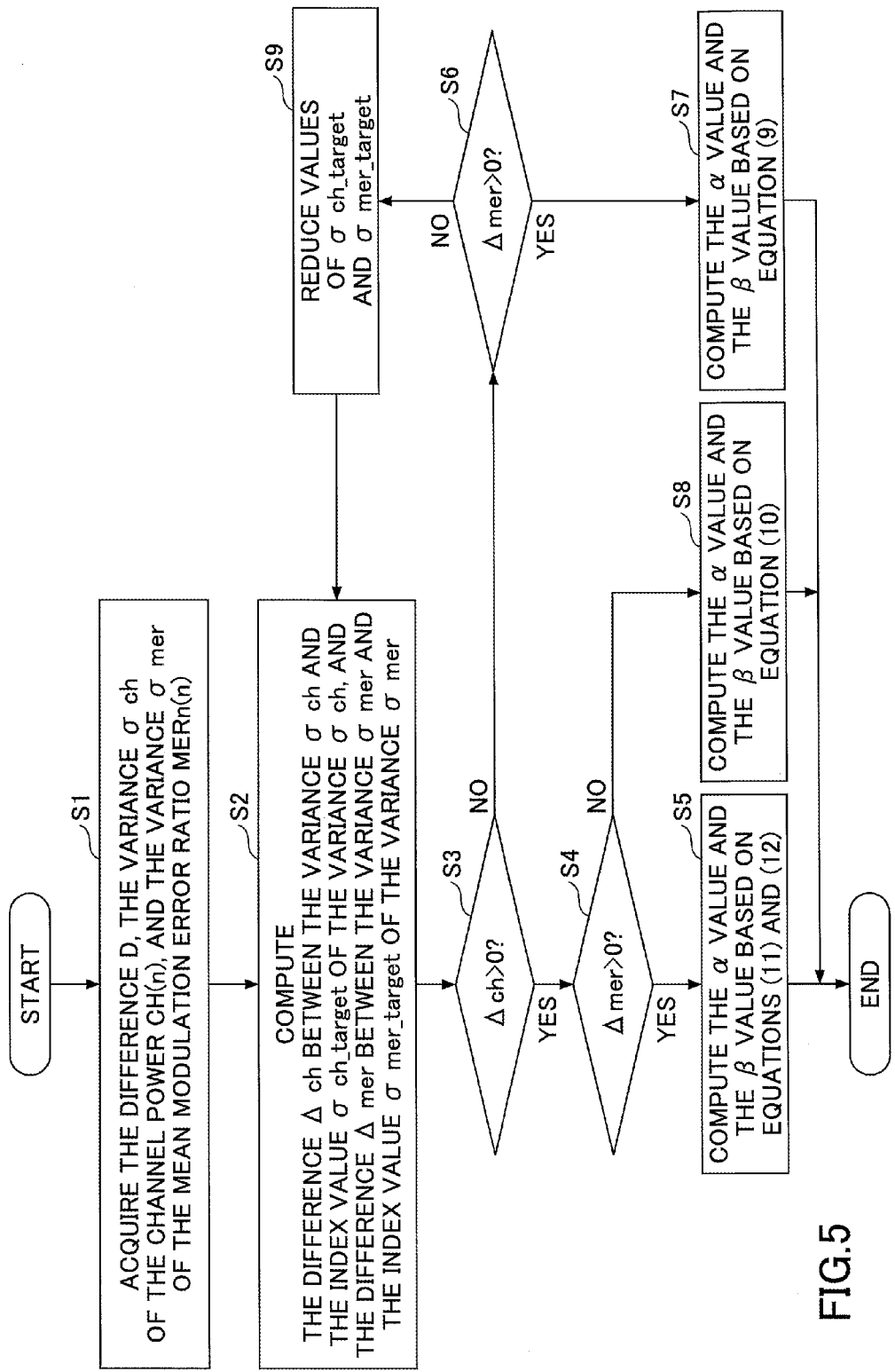
FIG. 5 is a flowchart illustrating a process in which a weighting controller 180 of the first embodiment acquires relaxing coefficients α and β (α value and β value)

FIG. 5 is a flowchart illustrating a process in which the weighting controller 180 of the first embodiment acquires relaxing coefficients α, β (α value, β value).

When the weighting controller 180 starts processing (start), the weighting controller 180 initially acquires the difference D, the variance σ ch of the channel power CH(n), and the variance σ mer of the mean modulation error ratio MERn(n) (step S1).

Subsequently, the weighting controller 180 computes the difference Δ ch between the variance σ ch and the index value σ ch_target of the variance σ ch, and the difference Δ mer between the variance σ mer and the index value σ mer_target of the variance σ mer (step S2). This process is performed based on the equations (7) and (8).

Subsequently, the weighting controller 180 determines whether Δch>0 is valid (step S3).

When the weighting controller 180 determines that Δ ch>0 is valid (YES in step S3), the weighting controller 180 determines whether Δ mer>0 is valid (step S4).

When the weighting controller 180 determines that Δ mer>0 is valid (YES in step S4), the weighting controller 180 computes the α value and the β value based on the equations (11) and (12) (step S5). Note that when the weighting controller 180 completes step S5, the weighting controller 180 terminates the process of the flow in FIG. 5 (end).

Note that when the weighting controller 180 determines that Δ ch>0 is invalid (NO in step S3), the weighting controller 180 determines whether Δmer>0 is valid (step S6).

Then, when the weighting controller 180 determines that Δ mer>0 is valid (YES in step S6), the weighting controller 180 computes the α value and the β value based on the equation (9) (step S7). Note that when the weighting controller 180 completes step 7, the weighting controller 180 terminates the process of the flow in FIG. 5 (end).

Then, when the weighting controller 180 determines that Δ mer>0 is invalid (NO in step S4), the weighting controller 180 computes the α value and the β value based on the equation (10) (step S8). Note that when the weighting controller 180 completes step 8, the weighting controller 180 terminates the process of the flow in FIG. 5 (end).

Further, when the weighting controller 180 determines that Δ mer>0 is invalid (NO in step S6), the weighting controller 180 reduces the index value σ ch_target and index value σ mer_target, and returns the flow to step S2 (step S9). As a result, step S2 and steps subsequent to step S2 are reprocessed.

As described above, the weighting controller 180 acquires the relaxing coefficients α and β (i.e., the α value and the β value).

Figure 6A:
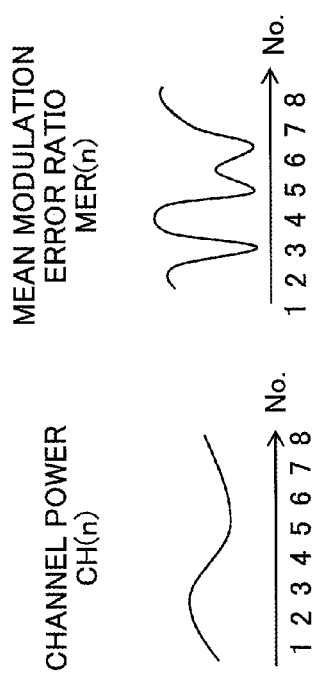
FIGS. 6A and 6B are diagrams illustrating effects of normalization processes performed by the likelihood weighting circuit 120 of the first embodiment.
Figure 6B:
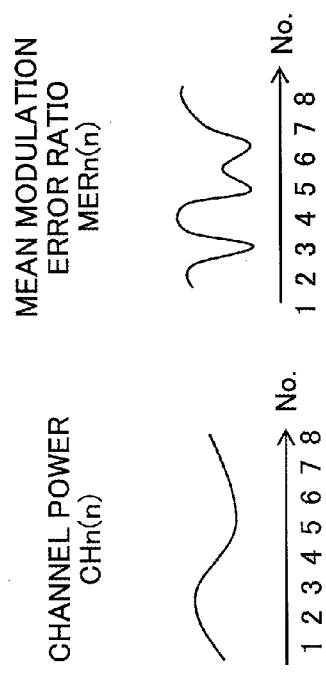

FIGS. 6A and 6B are diagrams illustrating effects obtained when normalization processes are performed by the likelihood weighting circuit 120 of the first embodiment.

FIG. 6A illustrates a distribution characteristic of the channel power CH(n) before the normalization process, a distribution characteristic of the mean modulation error ratio MER (n) before the normalization process, and a table representing respective amplitude values of the channel power CH(n) and the mean modulation error ratio MER(n) before the normalization process.

FIG. 6B illustrates a distribution characteristic of the channel power CHn(n) after the normalization process, a distribution characteristic of the mean modulation error ratio MERn (n) after the normalization process, and a table representing respective amplitude values of the channel power CHn(n) and the mean modulation error ratio MERn(n) after the normalization process.

Note that for the purpose of simplification, FIGS. 6A and 6B represent the channel power characteristics and the mean modulation error characteristics when the number of subcarriers is eight.

As illustrated in FIG. 6A, it is assumed that there is a relatively small dispersion (variance) in the channel power CH(n) before the normalization process, and there is a relatively large dispersion (variance) in the mean modulation error ratio MER(n) before the normalization process.

In this case, in the likelihood weighting circuit 120 of the first embodiment, the normalization processors 150A and 150B perform respective normalization processes of the channel power CH(n) and the mean modulation error ratio MER(n), based on the α value and the β value acquired based on the respective variances of the channel power CH(n) and the mean modulation error ratio MER(n).

Accordingly, the channel power CH(n) exhibiting the relatively small dispersion (variance) retains values of the subcarriers similar to those before being normalized as illustrated in FIG. 6B. That is, the characteristic of the channel power CH(n) is retained by the normalization process performed by the normalization processor 150A.

On the other hand, with respect to the mean modulation error ratio MER(n) exhibiting the relatively large dispersion (variance) before being normalized, the variance is restrained by the normalization process.

Specifically, as illustrated in FIG. 6A, the mean modulation error ratios MER(n) of the subcarrier numbers 3, 5, 6, and 7 before the normalization process are 2, 2, 2, 4, and 2, respectively, which are substantially low values compared to those of the mean modulation error ratios MER(n) of other subcarrier numbers. The mean modulation error ratios MER(n) of other subcarrier numbers 1, 2, 4, and 8 are 15, 13, 15, and 14, respectively.

By contrast, as illustrated in FIG. 6B, the mean modulation error ratios MERn(n) of the subcarrier numbers 3, 5, 6, and 7 after the normalization process are 5, 5, 7, and 5, respectively, and the mean modulation error ratios MERn(n) of other subcarrier numbers 1, 2, 4, and 8 are 12, 11, 12, and 10, respectively. That is, with respect to the mean modulation error ratio MER(n) exhibiting the relatively large dispersion (variance) before the normalization, the variance is corrected by being restrained by the normalization process such that the mean modulation error ratio MERn(n) after the normalization process retains a normalized distribution.

Note that an illustration is given of a case where the variance of the channel power CH(n) is relatively small, and the mean modulation error ratio MER(n) is relatively large. However, the likelihood weighting circuit 120 computes the α value and the β value separately by utilizing the variance calculators 140A and 140B, and the weighting controller 180. Then, the normalization processors 150A and 150B separately perform the normalization processes on the channel power CH(n) and the mean modulation error ratio MER(n) based on the α value and the β value, respectively.

Hence, when the variance of the channel power CH(n) is relatively large and the variance of the mean modulation error ratio MER(n) is relatively small, the variance of the channel power CH(n) is restrained by the normalization process, and the variance of the mean modulation error ratio MER(n) is retained such that the mean modulation error ratio MER(n) exhibits similar variances before and after the normalization process.

As described above, in the likelihood weighting circuit 120 of the first embodiment, the normalization processors 150A and 150B may be able to separately perform the normalization processes on the channel power CH(n) and the mean modulation error ratio MER(n) based on the respective variances of the channel power CH(n) and the mean modulation error ratio MER(n).

The multipliers 130A and 130B assign the weights to the soft-decision likelihood X(n,i) based on the channel power CHn(n) and the mean modulation error ratio MERn(n) obtained by the normalization processes separately performed by the normalization processors 150A and 150B so as to compute the soft-decision likelihood Y(n,i) as a result. The soft-decision likelihood Y(n,i) is computed by the following equation (13).

$$Y(n,i) = X(n,i) \times CHn(n) \times MERn(n) \quad (13)$$

In the equation (13), the channel power CHn(n) and the mean modulation error ratio MERn(n) have different properties.

The channel power CHn(n) may be able to detect instantaneous power fluctuation, and be thus effective mainly to observe the distortion due to the frequency selective fading. The mean modulation error ratio MERn(n), on the other hand, may be able to observe a periodic signal noise ratio (SNR) of a specific carrier, and be thus effective mainly to observe colored noise such as spurious noise.

That is, the likelihood weighting circuit 120 of the first embodiment may be able to separate effects of the frequency selective fading and the spurious noise, and assign the weights to the soft-decision likelihood X(n,i) based on respective levels of the separate effects of the frequency selective fading and the spurious noise to compute the soft-decision likelihood Y(n,i).

Accordingly, it may be possible to provide the likelihood weighting circuit 120 capable of computing appropriate likelihood under an environment of the spurious noise effect and the frequency selective fading effect being imposed.

Figure 7:
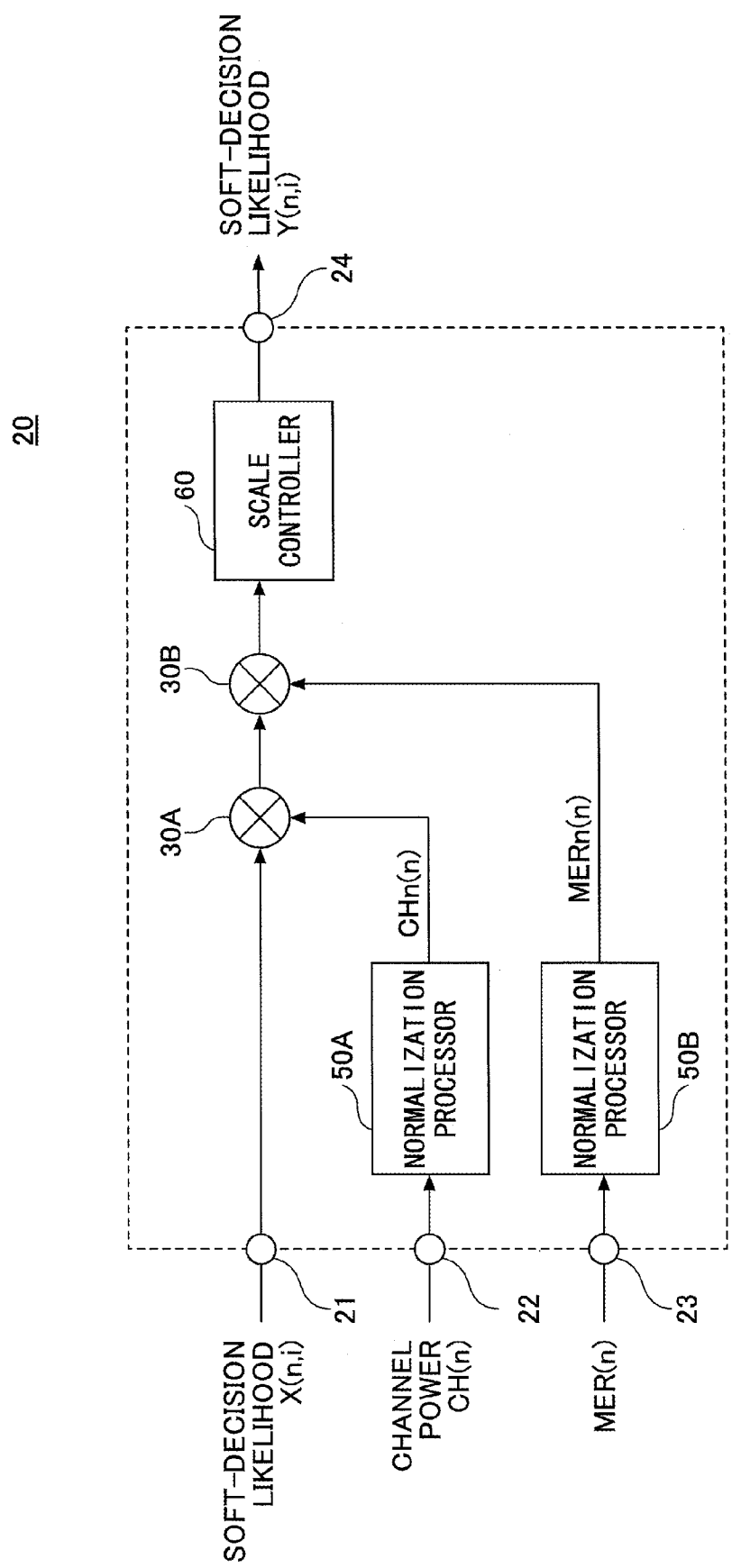
FIG. 7 is a diagram illustrating a comparative likelihood weighting circuit 20.

Note that an illustration is given of a comparative likelihood weighting circuit 20 in FIG. 7 in which weights are assigned to the channel power CH(n) and the mean modulation error ratio MER(n) so as to compare the comparative likelihood weighting circuit 20 with the likelihood weighting circuit 120.

FIG. 7 is a diagram illustrating the comparative likelihood weighting circuit 20. The comparative likelihood weighting circuit 20 includes input terminals 21, 22, and 23, an output terminal 24, a multipliers 30A and 30B, and normalization processors 50A and 50B.

A connection relationship between the input terminals 21, 22, and 23, the output terminal 24, the multipliers 30A and 30B, and the normalization processors 150A and 150B is similar to the connection relationship between the between the input terminals 121, 122, and 123, the output terminal 124, the multipliers 130A and 130B, and the normalization processors 150A and 150B in the likelihood weighting circuit 120 illustrated in FIG. 4.

This example illustrates the assignment of the weights to the channel power CH(n) and the mean modulation error ratio MER(n) when the likelihood weighting circuit 20 having the above configuration is used in place of the likelihood weighting circuit 120 illustrated in FIG. 2.

The normalization processors 150A and 150B respectively normalize the channel power CH(n) and the mean modulation error ratio MER(n) by the following equations (14) and (15) to obtain the channel power CHn(n) and the mean modulation error ratio MERn(n).

$$CHn(n) = \frac{CH(n)}{\sum_{n=1}^{N} CH(n)/N} \quad (14)$$

$$MERn(n) = \frac{MER(n)}{\sum_{n=1}^{N} MER(n)/N} \quad (15)$$

Then, the multipliers 30A and 30B multiply the soft-decision likelihood X (n,i) by the normalized channel power CHn(n) and the normalized mean modulation error ratio MERn(n) to obtain the soft-decision likelihood Y (n,i).

However, in the comparative likelihood weighting circuit 20, when drastic depression is locally observed in one of or both of the frequency selective fading and a carrier modulation error ratio (MER), the small scale value (the small amplitude) of the soft-decision likelihood Y (n,i) generates small subcarriers. Hence, the performance of the Viterbi decoding process by the Viterbi decoder 110 may be drastically degraded. To eliminate such a disadvantageous effect, Patent Documents 1 and 2 propose controlling the scale in the scale controller 60 to conduct a predetermined amplification process on the soft-decision likelihood Y (n,i) so as to prevent inputs to the Viterbi decoder 110 from being extremely low. To perform this process is virtually the same as to perform the relaxing process on the channel power CH(n) and the mean modulation error ratio MER(n) at similar levels without considering the respective variances of the channel power CH(n) and the mean modulation error ratio MER(n). This may result in degradation of the performance when distortion tendencies differ between the channel power CH(n) and the mean modulation error ratio MER(n). Specifically, when there is a difference between the variances of the channel power CH(n) and the mean modulation error ratio MER(n), the process is performed without considering the characteristic of amplitude distortion observed in one of the channel power CH(n) and the mean modulation error ratio MER(n) having a small variance, which may result in degradation of the performance.

In the following, a description is given of disadvantageous effects that may be obtained when the respective normalization processes are performed without considering the respective variances of the channel power CH(n) and the mean modulation error ratio MER(n) in the comparative likelihood weighting circuit 20.

Figure 8A:
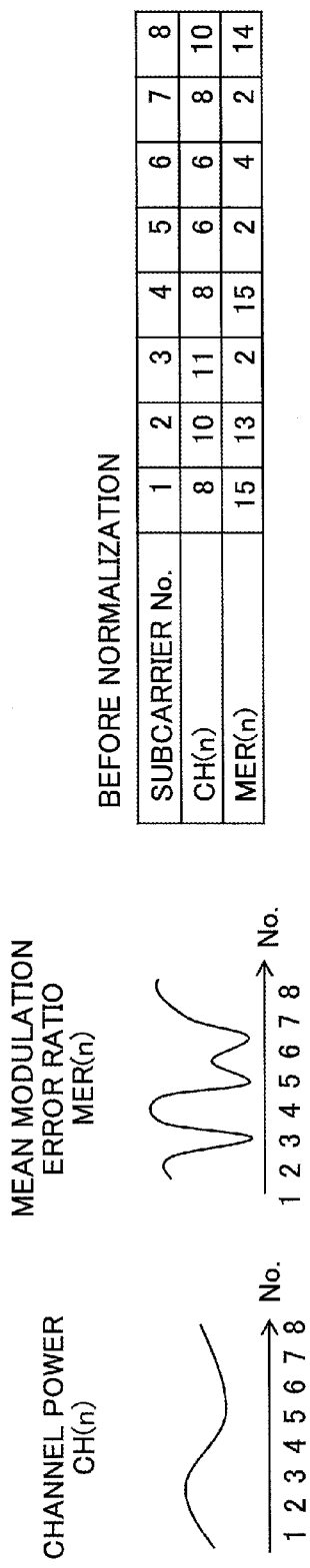
FIGS. 8A and 8B are diagrams illustrating effects obtained when normalization processes are performed by the comparative likelihood weighting circuit 20.
Figure 8B:
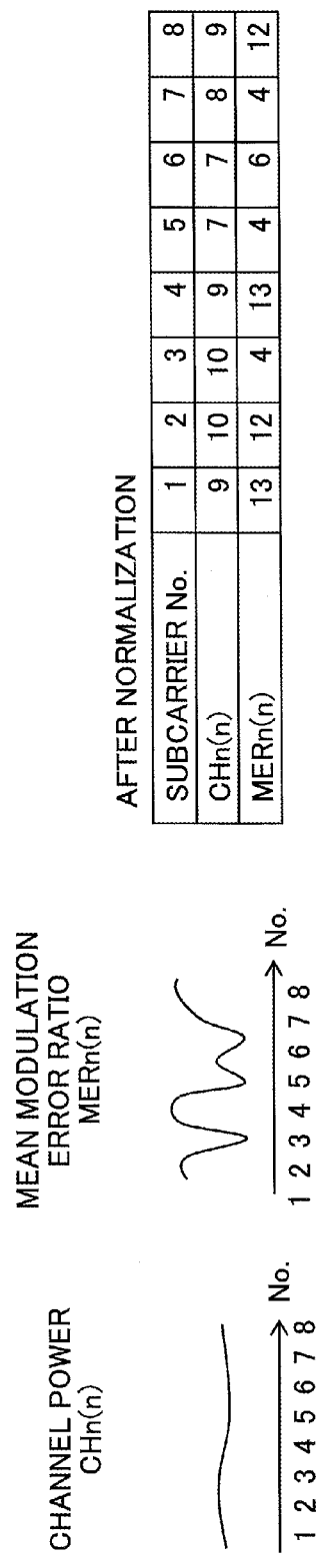

FIGS. 8A and 8B are diagrams illustrating effects obtained when normalization processes are performed by the comparative likelihood weighting circuit 20.

FIGS. 8A and 8B illustrate, similar to a case illustrated in FIGS. 6A and 6B, the channel power CH(n) and the mean modulation error ratio MER(n) before the respective normalization processes, and the channel power CHn(n) and the mean modulation error ratio MERn(n) after the respective normalization processes.

As illustrated in FIG. 8A, there is a relatively small dispersion (variance) in the channel power CH(n) before the normalization process, and there is a relatively large dispersion (variance) in the mean modulation error ratio MER(n) before the normalization process. These conditions of the channel power CH(n) and the mean modulation error ratio MER(n) are similar to those illustrated in FIG. 6A.

In this case, in the comparative likelihood weighting circuit 20, the normalization processes are performed on the channel power CH(n) and the mean modulation error ratio MER(n) by using the equations (14) and (15), respectively. However, these normalization processes are simply performed at the same level by using the equations (14) and (15) without taking account of the respective variances of the channel power CH(n) and the mean modulation error ratio MER(n).

Hence, as illustrated in FIG. 8A, when the variance of the channel power CH(n) is relatively small and the variance of the mean modulation error ratio MER(n) is relatively large, the averaged channel power CHn(n) and the averaged mean modulation error ratio MERn(n) may be observed after the respective normalization processes as illustrated in FIG. 8B.

In such a case, although the distribution of the mean modulation error ratio MER(n) exhibiting the relatively large variance is improved by performing the normalization process, the distribution of the channel power CH(n) exhibiting the relatively small variance is made unclear by performing the normalization process. As a result, the distortion of the channel power CH(n) is unclear.

Thus, when the soft-decision likelihood Y(n,i) is obtained by multiplying the soft-decision likelihood X (n,i) by the normalized channel power CHn(n) and the normalized mean modulation error ratio MERn(n) computed in the comparative likelihood weighting circuit 20, the effect of the frequency selective fading may be unclear. As a result, the computation of appropriate likelihood may be difficult under the environment of having both effects of the frequency selective fading and the spurious noise.

On the other hand, when the variance of the channel power CH(n) is relatively large, and the variance of the mean modulation error ratio MER(n) is relatively small, the effect of the spurious noise may be unclear. Hence, the computation of the appropriate likelihood may be difficult under the environment of having both effects of the frequency selective fading and the spurious noise.

Note that in these cases, it may be proposed to increase the scale (i.e., the values of the likelihood) of the soft-decision likelihood Y(n,i). However, even though the scale of the soft-decision likelihood Y (n,i) is uniformly increased, the increased effects on the frequency selective fading and the spurious noise may be similar. Hence, it may be difficult to compute appropriate likelihood.

By contrast, the likelihood weighting circuit 120 of the first embodiment may be able to separate effects of the frequency selective fading and the spurious noise, and assign the weights to the soft-decision likelihood X(n,i) based on respective levels of the separate effects of the frequency selective fading and the spurious noise to compute the soft-decision likelihood Y(n,i).

Accordingly, the first embodiment may provide the likelihood weighting circuit 120 capable of computing appropriate likelihood under the environment of the spurious noise effect and the frequency selective fading effect being imposed.

Second Embodiment

Figure 9:
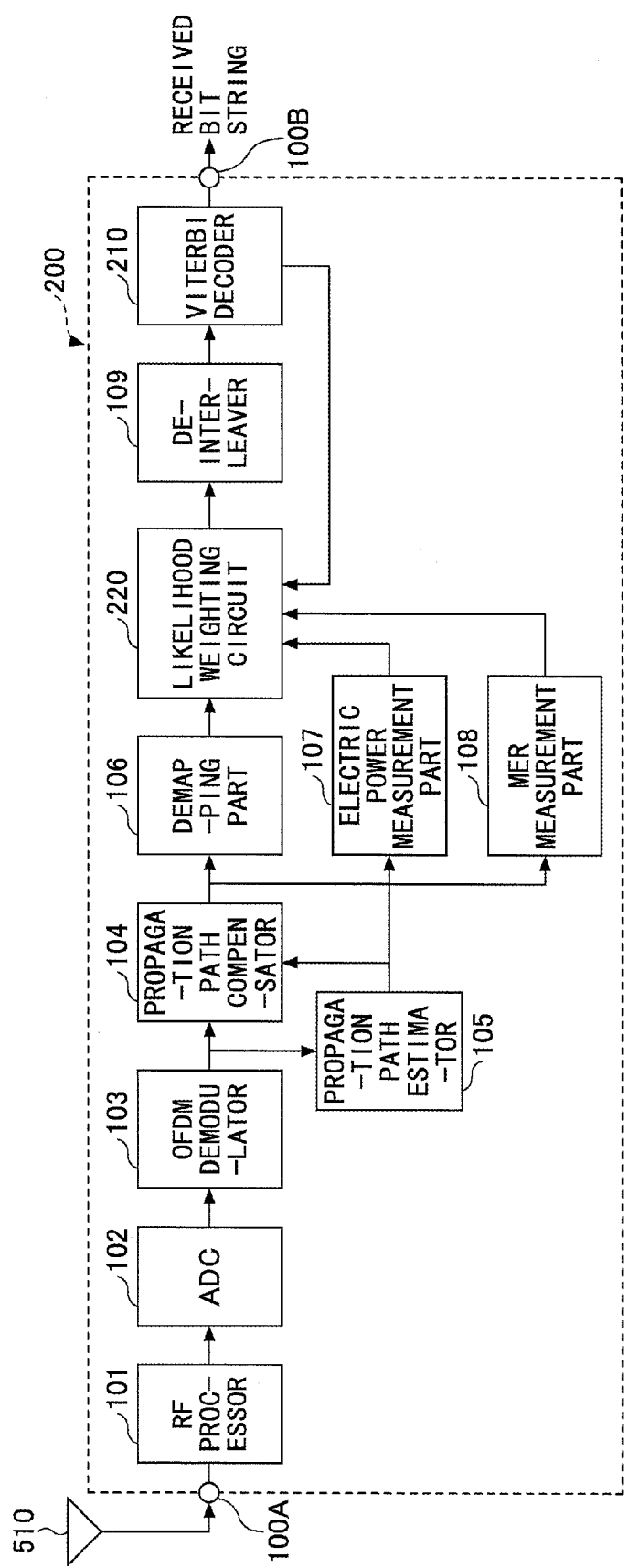
FIG. 9 is a diagram illustrating an orthogonal frequency-division multiplexing (OFDM) receiver 200 of a second embodiment.

FIG. 9 is a diagram illustrating an orthogonal frequency-division multiplexing (OFDM) receiver 200 of a second embodiment. The OFDM receiver 200 includes a likelihood weighting circuit 220 and a Viterbi decoder 210 instead of the likelihood weighting circuit 120 and the Viterbi decoder 110 of the first embodiment. More specifically, in the OFDM receiver 200 of the second embodiment, the configuration of the likelihood weighting circuit 220 mainly differs from the configuration of the likelihood weighting circuit 120 in the OFDM receiver 100 of the first embodiment.

In the following, components similar to those of the OFDM receiver 100 of the first embodiment are provided with the same reference numbers to omit duplicated illustrations.

The OFDM receiver 200 of the second embodiment illustrated in FIG. 9 includes a configuration differing from the configuration of the first embodiment in which when the Viterbi decoder 210 performs error determination, an error signal indicating that the Viterbi decoder 210 has performed error determination is supplied to the likelihood weighting circuit 220.

The likelihood weighting circuit 220 assigns weights to soft-decision likelihood X(n,i) for each subcarrier and each bit based on the channel power CH(n), the mean modulation error ratio MER(n), and the error signal supplied from the Viterbi decoder 210 so as to compute the soft-decision likelihood Y(n,i) for the corresponding subcarrier and the corresponding bit. Next, details of the assignment of the weights by the likelihood weighting circuit 220 are described with reference to FIG. 10.

Figure 10:
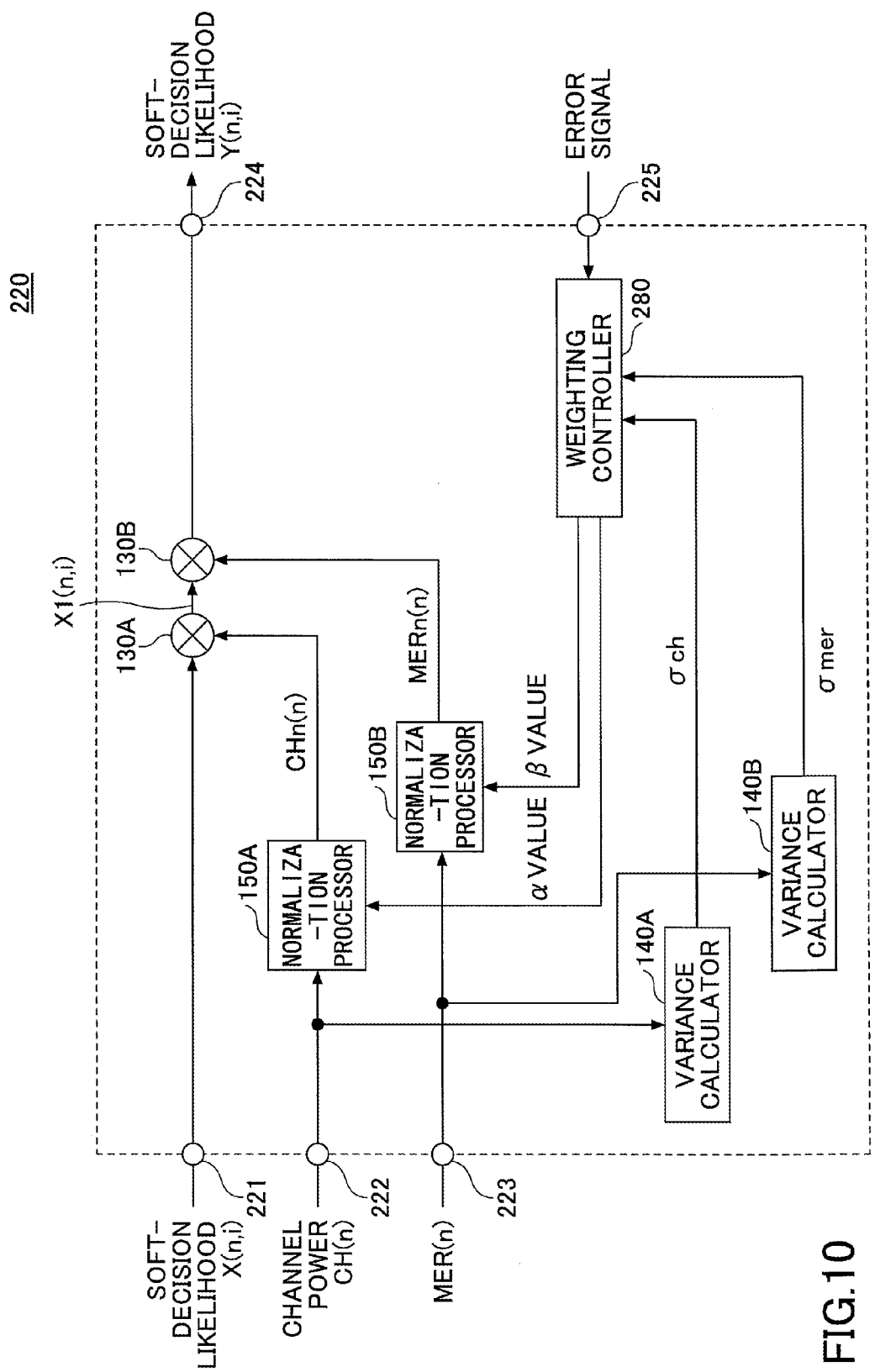
FIG. 10 is a diagram illustrating a likelihood weighting circuit 220 of a second embodiment.

FIG. 10 is a diagram illustrating the likelihood weighting circuit 220 of the second embodiment.

The likelihood weighting circuit 220 includes input terminals 221, 222, 223 and 225, an output terminal 224, multipliers 130A and 130B, variance calculators 140A and 140B, a normalization processor 150A, a normalization processor 150B, and a weighting controller 280.

In the following, components similar to those of the likelihood weighting circuit 120 of the first embodiment are provided with the same reference numbers to omit duplicated illustrations.

The input terminals 221, 222, and 223 are similar to the input terminals 121, 122, and 123 of the first embodiment, and the output terminal 224 is similar to the output terminal 124 of the first embodiment.

The input terminal 225 is connected to the Viterbi decoder 210 (see FIG. 9), and receives an error signal. The input terminal 225 is further connected to the weighting controller 280 inside the likelihood weighting circuit 220, and inputs the error signal received from the Viterbi decoder 210 into the weighting controller 280.

The likelihood weighting circuit 220 of the second embodiment differs from the likelihood weighting circuit 120 of the first embodiment in the following points. That is, the likelihood weighting circuit 220 does not include the scale measurement part 160 and the adder 170, and computes the α value and the β value by utilizing the error signal output from the Viterbi decoder 210 instead of the difference D in the first embodiment.

The weighting controller 280 receives the variance σ ch of the channel power CH(n), the variance σ mer of the mean modulation error ratio MER(n), and the error signal. Further, the weighting controller 280 computes the α value based on the variance σ ch of the channel power CH(n) supplied from the variance calculator 140A and the error signal, and to compute the β value based on the variance σ mer of the mean modulation error ratio MER(n) supplied from the variance calculator 140B and the error signal.

The α value indicates a level of relaxing the assignment of the weight to the soft-decision likelihood X(n,i) based on the channel power CH(n). The α value is an example of the first relaxing level. The greater the error signal is, the higher the α value is set. Thus, the higher the value of the error signal is, the more relaxed the weight assigned to the soft-decision likelihood X (n,i) based on the channel power CH(n) is.

The β value indicates a level of relaxing the assignment of the weight to the soft-decision likelihood X(n,i) based on the mean modulation error ratio MER(n). The β value is an example of the second relaxing level. The greater the error signal is, the higher the β value is set. Thus, the higher the value of the error signal is, the more relaxed the weight assigned to the soft-decision likelihood X(n,i) based on the mean modulation error ratio MER(n) is.

Note that the error signal represents an error determination level of determining an error in the Viterbi decoding process performed by the Viterbi decoder 210. Thus, the error level indicates a bit error ratio or a status error ratio in the Viterbi decoding process performed by the Viterbi decoder 210.

Note that the equations (9), (10), (11), and (12) used for computing the α value and the β value in the first embodiment employ the difference D. However, the bit error ratio or the status error ratio represented by the error signal may be employed in the second embodiment instead of the difference D.

Accordingly, in the likelihood weighting circuit 220 of the second embodiment, the α value and the β value may be computed based on the channel power CH(n), the mean modulation error ratio MER(n), and the error signal similar to the likelihood weighting circuit 120 of the first embodiment.

Hence, the likelihood weighting circuit 220 of the second embodiment assigns the weights to the soft-decision likelihood X(n,i) to compute the soft-decision likelihood Y(n,i) similar to the likelihood weighting circuit 120 of the first embodiment.

As described above, in the likelihood weighting circuit 220 of the second embodiment, the normalization processors 150A and 150B may be able to separately perform the normalization processes on the channel power CH(n) and the mean modulation error ratio MER(n) based on the respective variances of the channel power CH(n) and the mean modulation error ratio MER(n).

The multipliers 130A and 130B assign the weights to the soft-decision likelihood X(n,i) based on the channel power CHn(n) and the mean modulation error ratio MERn(n) obtained by the normalization processes separately performed by the normalization processors 150A and 150B so as to compute the soft-decision likelihood Y(n,i) as a result.

That is, the likelihood weighting circuit 220 of the second embodiment may be able to separate effects of the frequency selective fading and the spurious noise, and assign the weights to the soft-decision likelihood X(n,i) based on respective levels of the separate effects of the frequency selective fading and the spurious noise to compute the soft-decision likelihood Y(n,i).

Accordingly, it may be possible to provide the likelihood weighting circuit 220 capable of computing appropriate likelihood under an environment of the spurious noise effect and the frequency selective fading effect being imposed.

The embodiments of the likelihood weighting circuit are described above; however, the invention is not limited to those specifically described embodiments. Various alterations and modifications may be made without departing from the scope of the claimed invention.

According to the disclosed embodiments, it may be possible to provide the likelihood weighting circuit capable of computing appropriate likelihood under an environment of the spurious noise effect and the frequency selective fading effect being imposed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present inventions have been described in detail, it should be understood that the various changes, substitutions, and alterations could be made hereto without departing from the spirit and scope of the invention.

What is claimed is:

1. A likelihood weighting circuit comprising:
   a weighting part configured to assign a weight to a first soft-decision likelihood obtained by soft-decision performed with respect to a subcarrier included in a received signal decoded by an orthogonal frequency-division multiplexing (OFDM) based on one of a power value of the received signal and a modulation error ratio of the subcarrier;
   a first variance calculator configured to calculate a variance of the power value of the received signal;

a second variance calculator configured to calculate a variance of the modulation error ratio of the subcarrier;

a likelihood measurement part configured to measure a distribution of a second soft-decision likelihood obtained by assigning the weight to the first soft-decision likelihood obtained by the weighting part;

a controller configured to compute a first relaxing level of the power value of the received signal and a second relaxing level of the modulation error ratio of the subcarrier based on the variance of the power value, the variance of the modulation error ratio, and a value of the second soft-decision likelihood;

a first normalization processor configured to perform a first normalization process on the power value of the received signal input to the weighting part based on the first relaxing level; and a second normalization processor configured to perform a second normalization process on the modulation error ratio of the subcarrier input to the weighting part based on the second relaxing level.

2. The likelihood weighting circuit as claimed in claim 1, wherein the controller computes the first relaxing level of the power value of the received signal and the second relaxing level of the modulation error ratio of the subcarrier based on the variance of the power value, the variance of the modulation error ratio, and a difference between the value of the second soft-decision likelihood and a predetermined target value.

3. The likelihood weighting circuit as claimed in claim 2, wherein the controller increases the first relaxing level of the power value of the received signal or the second relaxing level of the modulation error ratio of the subcarrier as the difference between the value of the second soft-decision likelihood and the predetermined target value increases.

4. The likelihood weighting circuit as claimed in claim 2, wherein the predetermined target value increases as an encoding ratio of the received signal increases.

5. A likelihood weighting circuit comprising:

a weighting part configured to assign a weight to a first soft-decision likelihood obtained by soft-decision performed with respect to a subcarrier included in a received signal decoded by an orthogonal frequency-division multiplexing (OFDM) based on one of a power value of the received signal and a modulation error ratio of the subcarrier;

a first variance calculator configured to calculate a variance of the power value of the received signal;

a second variance calculator configured to calculate a variance of the modulation error ratio of the subcarrier;

a controller configured to compute a first relaxing level of the power value of the received signal and a second relaxing level of the modulation error ratio of the subcarrier based on the variance of the power value, the variance of the modulation error ratio, and an error determination level of determining an error in a Viterbi decoding process performed on the second soft-decision likelihood obtained by assigning the weight to the first soft-decision likelihood;

a first normalization processor configured to perform a first normalization process on the power value of the received signal input to the weighting part based on the first relaxing level; and a second normalization processor configured to perform a second normalization process on the modulation error ratio of the subcarrier input to the weighting part based on the second relaxing level.

6. The likelihood weighting circuit as claimed in claim 5, wherein the controller increases the first relaxing level of the power value of the received signal or the second relaxing level of the modulation error ratio of the subcarrier as the error determination level increases.

7. The likelihood weighting circuit as claimed in claim 1, wherein the controller increases the first relaxing level as the power value of the received signal increases, or increases the second relaxing level as the modulation error ratio of the subcarrier increases.

8. The likelihood weighting circuit as claimed in claim 7, wherein the controller increases the first relaxing level as the power value of the received signal increases, or increases the second relaxing level as the modulation error ratio of the subcarrier increases, based on a ratio of the variance of the power value and the variance of the modulation error ratio.

9. The likelihood weighting circuit as claimed in claim 1, wherein the first normalization processor performs the first normalization such that a deviation of the power value of the received signal obtained after the first normalization process decreases as the first relaxing level increases, or the second normalization processor performs the second normalization process such that the modulation error ratio of the subcarrier obtained after the second normalization process decreases as the second relaxing level increases.

10. The likelihood weighting circuit as claimed in claim 1, wherein the power value of the received signal indicates a value of channel power of the subcarrier of the received signal.

* * * * *